(12) United States Patent
Satran et al.

(10) Patent No.: US 7,121,769 B2
(45) Date of Patent: Oct. 17, 2006

(54) ROTARY SLOT MILLING CUTTER AND CUTTING INSERT THEREFOR

(75) Inventors: Amir Satran, Kfar Vradim (IL); Tsvia Fishman, Kiryat Motzkin (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 10/965,723

(22) Filed: Oct. 18, 2004

(65) Prior Publication Data
US 2005/0117981 A1    Jun. 2, 2005

(30) Foreign Application Priority Data
Dec. 2, 2003    (IL) ..................... 159157

(51) Int. Cl.
*B23C 5/22* (2006.01)
(52) U.S. Cl. .......................... 407/40; 407/46
(58) Field of Classification Search ................. 407/40, 407/42, 46, 48, 113, 34, 47
See application file for complete search history.

(56) References Cited

U.S. PATENT DOCUMENTS

| | | | |
|---|---|---|---|
| 3,002,405 A | * | 10/1961 | Heftler ..................... 408/197 |
| 3,701,187 A | * | 10/1972 | Erkfritz ..................... 407/46 |
| 4,995,766 A | * | 2/1991 | Coleman ..................... 407/34 |
| 5,004,380 A | | 4/1991 | Hessman et al. |
| 5,800,079 A | * | 9/1998 | Qvarth ..................... 407/46 |
| 6,203,251 B1 | * | 3/2001 | Oppelt et al. ................. 407/48 |
| 6,840,716 B1 | * | 1/2005 | Morgulis et al. ............. 407/34 |
| 2002/0017014 A1 | | 2/2002 | Takeuchi et al. |
| 2002/0053266 A1 | | 5/2002 | Enquist |

FOREIGN PATENT DOCUMENTS

DE    43 30 668    9/1993

OTHER PUBLICATIONS

Tool and Manufacturing Engineers Handbook, vol. 1 Machining, Thomas J. Drozda and Charles Wick, Fourth Edition, Cahpeter 8, p. 8-40.*

* cited by examiner

*Primary Examiner*—Monica Carter
*Assistant Examiner*—Sara Addisu
(74) *Attorney, Agent, or Firm*—Womble Carlyle (57) ABSTRACT

A rotary slot milling cutter has a plurality of cutting portions, each cutting portion having an insert pocket and a cutting insert removably mounted therein. The cutting insert includes a top face and a bottom face which has two spaced-apart abutments, with a ceiling formed therebetween. The insert pocket has a generally axially disposed pocket base provided with two support surfaces and a radially extending rib disposed therebetween, the rib having a roof and two banks. When the cutting insert is mounted in the insert pocket, the abutment platforms abut the support surfaces, and a gap exists between the roof of the rib and the ceiling, and between each side-slope and adjacent banks.

11 Claims, 9 Drawing Sheets

025# ROTARY SLOT MILLING CUTTER AND CUTTING INSERT THEREFOR

FIELD OF THE INVENTION

The present invention relates to a rotary metal cutting tool and particularly to a slot milling cutter having a disk-shaped tool body with tangential cutting inserts mounted in the periphery thereof.

BACKGROUND OF THE INVENTION

DE 43 30 668 A1 (WO 95/07162) discloses a U-shaped, or a bridge-shaped, indexable cutting insert for mounting in an end-mill designed for milling thin slots. The cutting insert has a plate-shaped or approximately plate-shaped fixation element disposed between two edge zones of larger cross-section which carry the cutting edges. The end-mill carries a plurality of the cutting inserts, arranged alternately on both sides of its disk-shaped tool body. When mounted, the fixation element abuts a groove in the face of the tool body. Precise finish of the fixation element is essential for providing a tool with an accurate width of cut. This necessitates grinding of the fixation element. Since the support (or fixation) surface of the cutting insert disclosed in DE 43 30 668 A1 is disposed between the two thicker end-zones, an additional, dedicated grinding phase must be executed to polish the fixation element, which is a time-consuming and expensive process.

Figure 5:
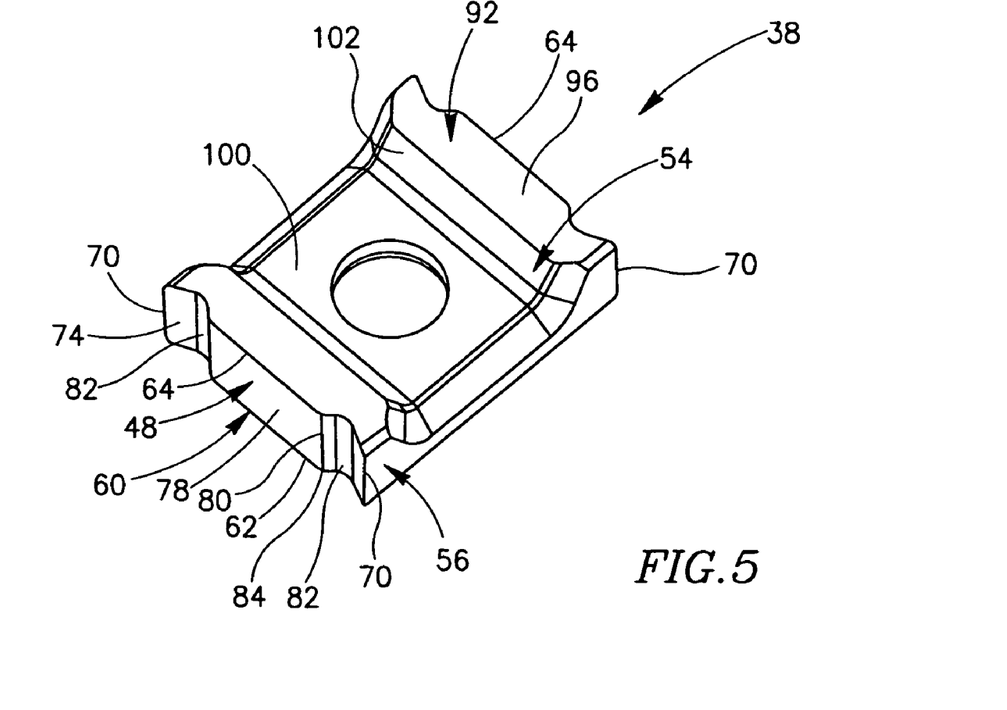
FIG. 5 is a bottom perspective view of the cutting insert shown in FIG. 3.
Figure 6:
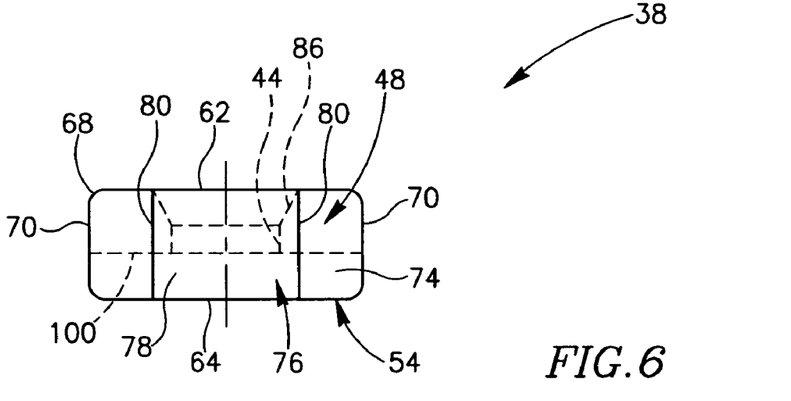
FIG. 6 is an end view of the cutting insert shown in FIG. 4.

The cutting insert is clamped to the tool body by means of a clamping screw. To provide secure engagement of the clamping screw in the tool body, a protrusion is formed in the tool body, and a corresponding recess is formed in the fixation element of the cutting insert, as shown in FIGS. 5 and 6 in the above-cited reference. As the fixation element is already the thinnest element in the cutting insert, forming recess therein weakens the cutting insert and complicates manufacturing of the cutting inserts and the tool body.

SUMMARY OF THE INVENTION

In accordance with the present invention, there is provided a rotary milling cutter having an axis of rotation A comprising a plurality of cutting portions, each cutting portion comprising an insert pocket and a cutting insert, the cutting insert being removably mounted in the insert pocket, the cutting insert comprises a top face and a bottom face, the bottom face comprising two spaced-apart abutments, with a ceiling formed therebetween, each abutment comprising an abutment platform and a side-slope; the insert pocket has a generally axially disposed pocket base comprising two support surfaces and a radially extending rib disposed therebetween, the rib comprising a roof and two banks, so that when the cutting insert is mounted in the insert pocket, the abutment platforms abut the support surfaces, and a gap exists between the roof of the rib and the ceiling, and between each side-slope and adjacent bank.

Further in accordance with the present invention, the insert pocket comprises a generally radial support wall and a generally tangential support wall, and the rib merges with the radial support wall.

Yet further in accordance with the present invention, the cutting insert comprises two identical, opposing and parallel end faces having a peripheral surface extending therebetween, the peripheral surface comprising a top face perpendicular to the end faces, a bottom face opposed to the top face, and two opposing, identical side faces parallel to each other and perpendicular to the end faces and to the top and bottom faces. Each end face meets each of the two identical side faces at two cutting edges.

In accordance with the present invention, an abutment surface is disposed in each end face, between the two cutting edges of each end face, and the abutment surface of one of the end faces abuts the tangential support wall and one of side face abuts the radial support wall.

Preferably, each side-slope is inclined at an acute side-slope angle $\alpha$ with respect to an imaginary plane P passing through the two abutment platforms.

Further preferably, the side-slope angle $\alpha$ is between 20 degrees and 50 degrees.

Yet further preferably, the side-slope angle $\alpha$ is 30 degrees.

In accordance with the present invention, each insert pocket is an integral part of a tool body of the rotary milling cutter.

Alternatively, each insert pocket is an integral part of a cartridge, the cartridge being slidably retained in a tool body of the rotary milling cutter.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Figure 1:
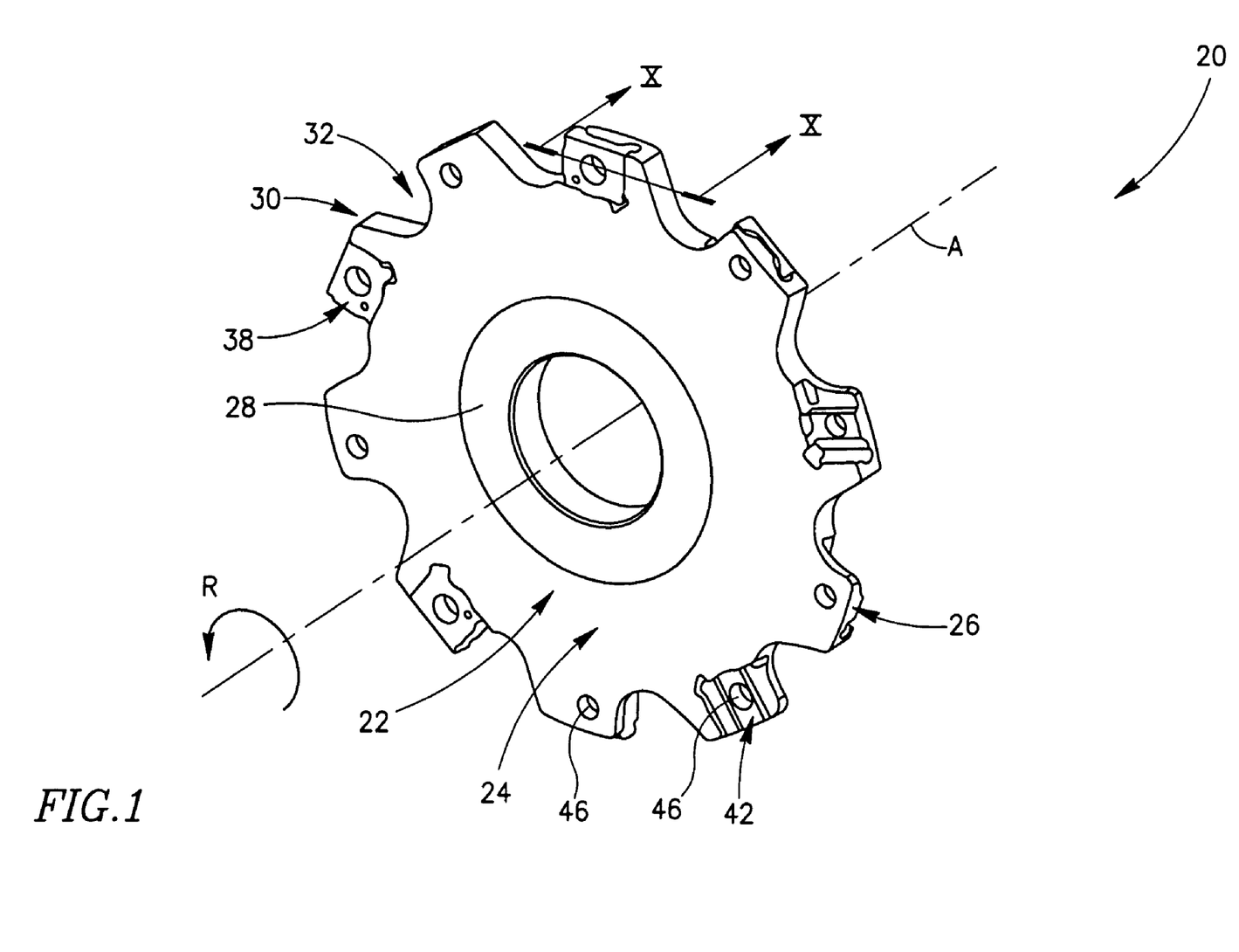
FIG. 1 is a perspective view of a rotary slot milling cutter in accordance with a preferred embodiment of the present invention.
Figure 2:
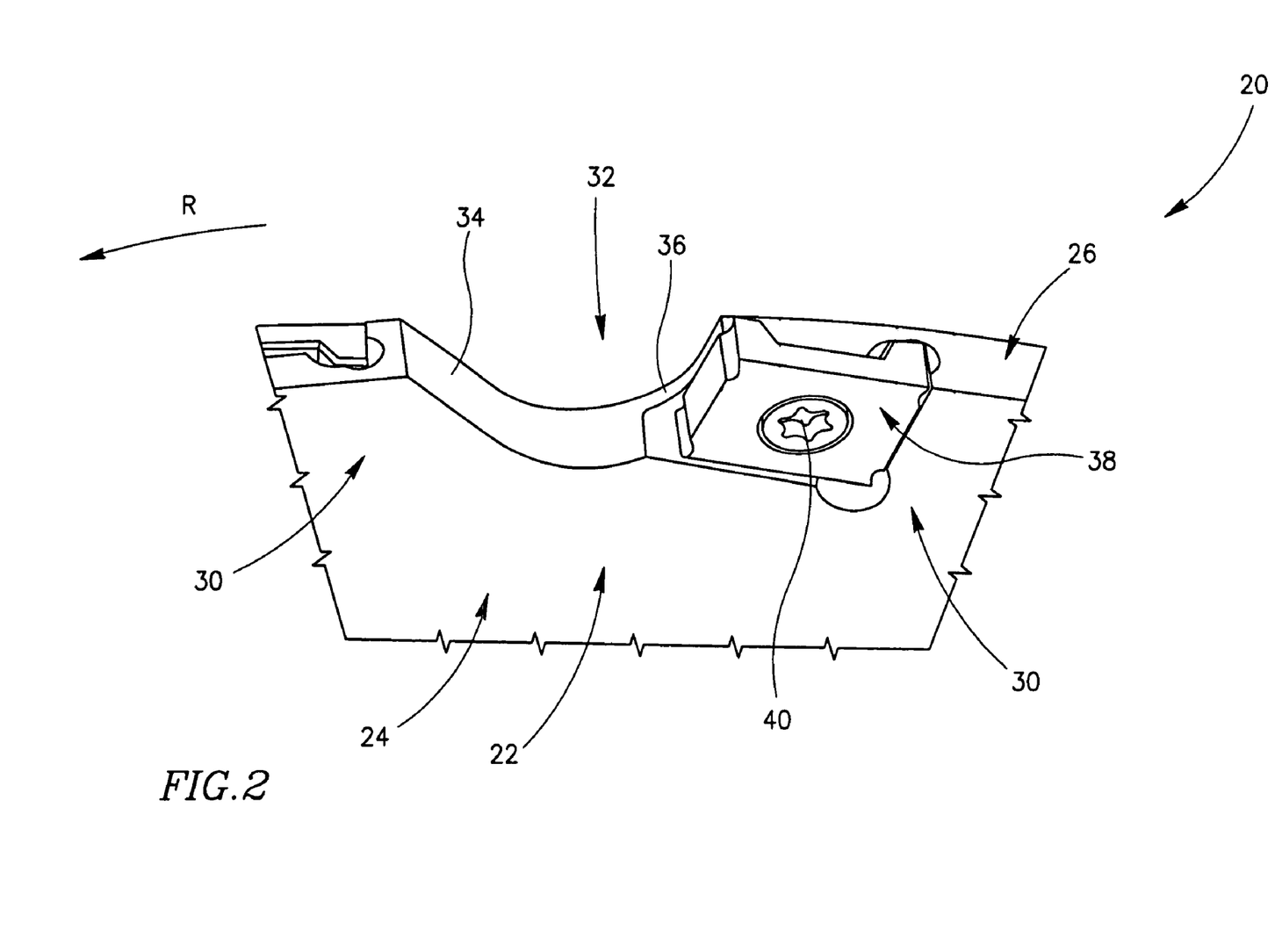
FIG. 2 is a detail perspective view of a cutting portion of the rotary slot milling cutter shown in FIG. 1.

Attention is drawn to FIGS. 1 and 2, showing a rotary slot milling cutter 20 in accordance with a first embodiment of the present invention. The rotary slot milling cutter 20 has an axis of rotation A about which a direction of rotation R is defined, and comprises a tool body 22 having a generally circular disk shape. The tool body 22 has two opposing circular faces 24, 24' (see also FIG. 10) with a peripheral tool face 26 extending therebetween, and comprises a central portion 28, which facilitates attachment of the rotary slot milling cutter 20 to a spindle of a milling machine (not shown), and is shaped accordingly. The rotary slot milling cutter 20 comprises a plurality of peripheral cutting portions 30, each preceded by a chip clearance recess 32 having a leading end 34 and a trailing end 36. The terms "preceded", "trailing" and "leading" are defined with respect to the direction of rotation R of the rotary slot milling cutter 20.

Figure 3:
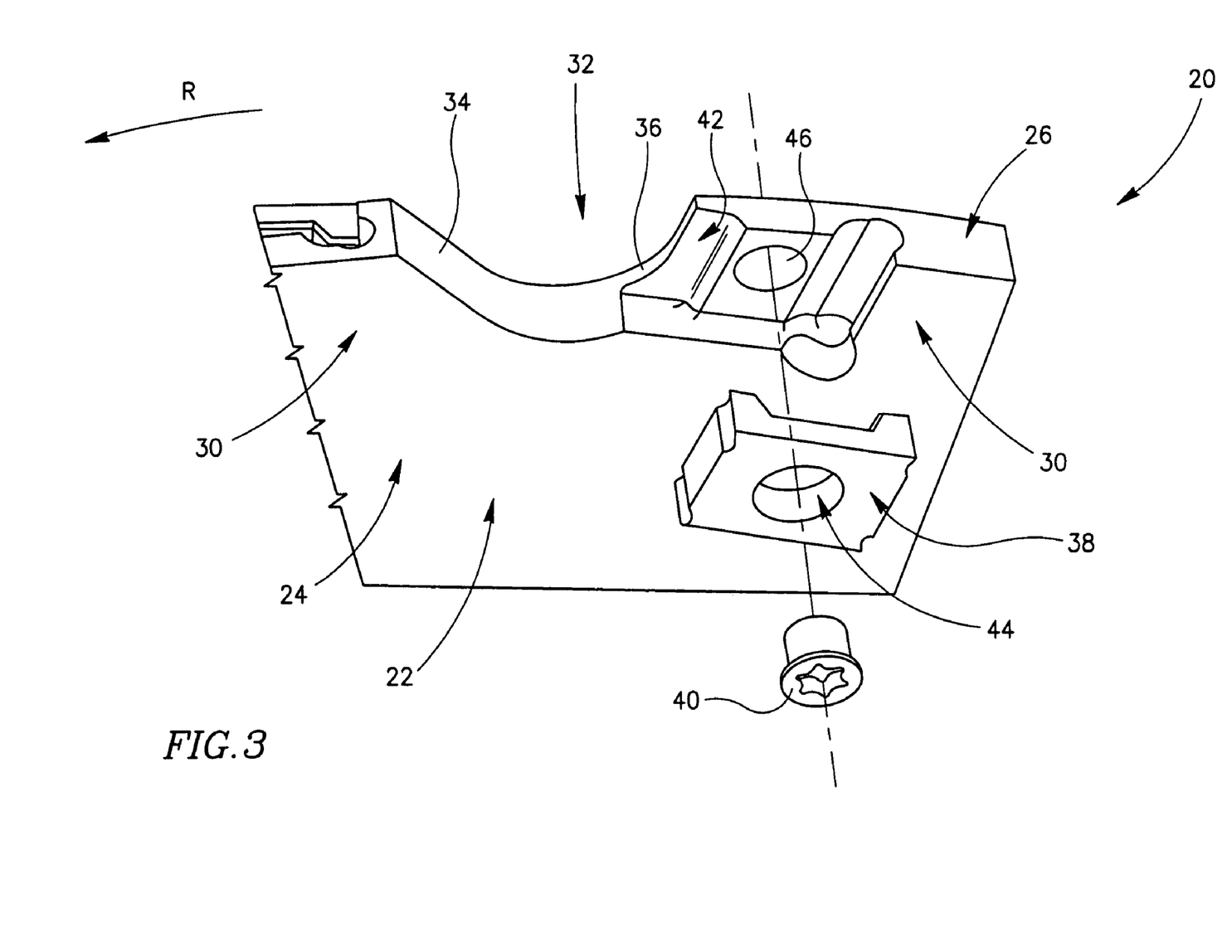
FIG. 3 is a detail exploded view of the cutting portion shown in FIG. 2.

Attention is now drawn into FIGS. 2 and 3. Each cutting portion 30 comprises an indexable, tangential cutting insert 38 secured by a clamping screw 40 to an insert pocket 42. The cutting insert 38 is typically manufactured by form-pressing and sintering carbide powders and the like, used in metal-cutting operations; however, other techniques, such as injection molding techniques, can also be used. Consecutive insert pockets 42 open alternately to the two opposing circular faces 24, 24' of the tool body 22. The clamping screw 40 passes through a clamping through-hole 44 in the cutting insert 38 and threadingly engages a threaded clamping bore 46 disposed in the insert pocket 42.

Figure 4:
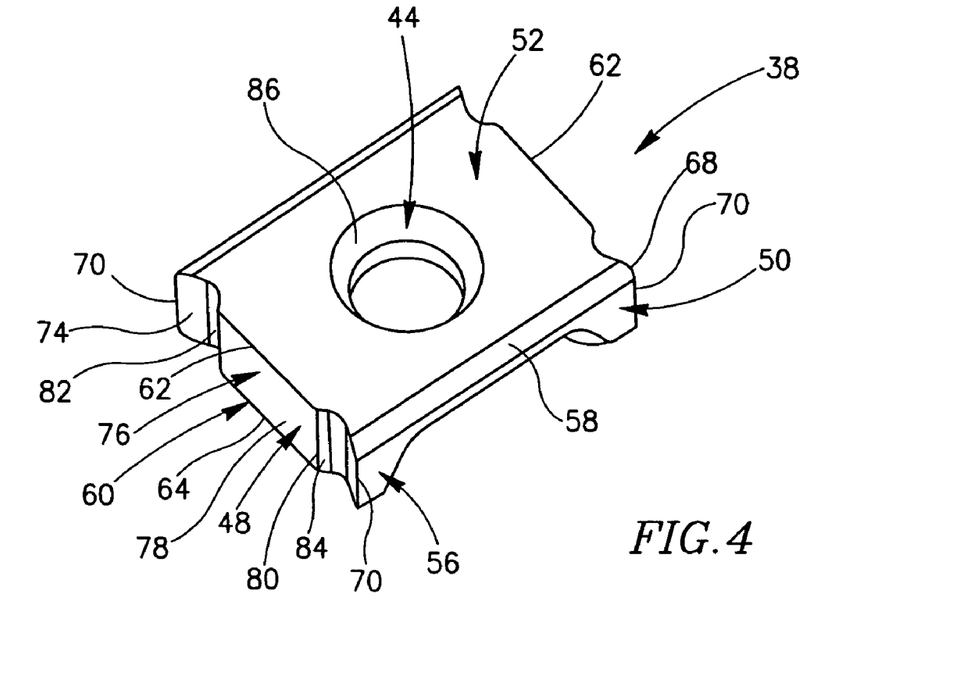
FIG. 4 is a top perspective view of the cutting insert shown in FIG. 3.

As shown in FIGS. 4 and 5, the cutting insert 38 has two identical, opposing and parallel end faces 48, with a peripheral surface 50 extending therebetween. The peripheral insert surface 50 comprises a top face 52, a bottom face 54, and two opposing, identical, side faces 56. The two opposing, identical side faces 56 are parallel to each other, and generally perpendicular to the top and bottom faces 52, 54 and to the end faces 48.

A peripheral edge 60 is formed at the intersection of each end face 48 and the peripheral insert surface 50 of the cutting insert 38. As shown in FIG. 6, the peripheral edge 60 comprises a top edge 62, a bottom edge 64 and two side edges constituting cutting edges 70. Disposed in each end face 48, and adjacent each of the cutting edges 70, is a rake surface 74, the rake surface 74 being generally perpendicular to the top and bottom faces 52, 54.

The cutting insert 38 has a total of four indexable cutting edges 70, and can function as either a "right-handed" or a "left-handed" cutting insert. Two diagonally opposed cutting edges 70 function in "right-handed" cutting, and the other two diagonally opposed cutting edges 70 function in "left-handed" cutting.

Each end face 48 is provided with an abutment surface 78 of rectangular shape, extending between the bottom edge 64 and the top edge 62 of the end face 48, and bounded by two parallel short edges 80, the short edges 80 being perpendicular to the top and bottom faces 52, 54. Disposed between the rake surface 74 and the abutment surface 78 is a chip groove 82. Extending from the short edge 80 to the chip groove 82 is a chip deflector 84.

Figure 7:
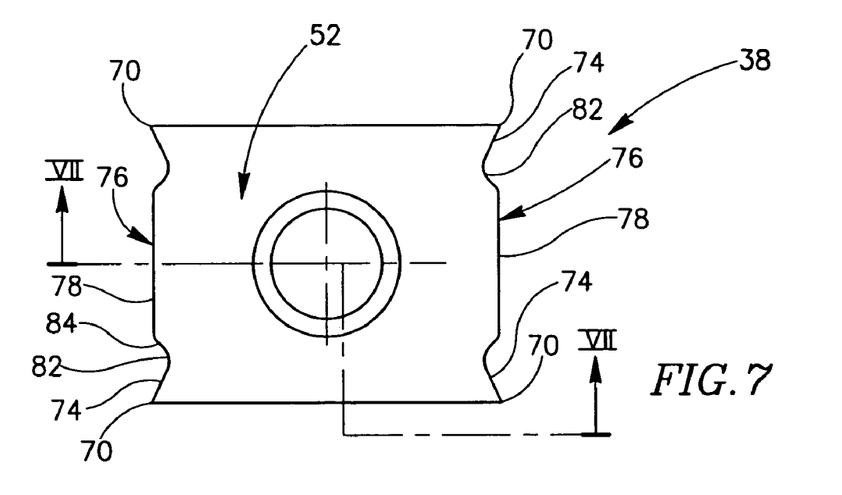
FIG. 7 is a top view of the cutting insert shown in FIG. 4.
Figure 8:
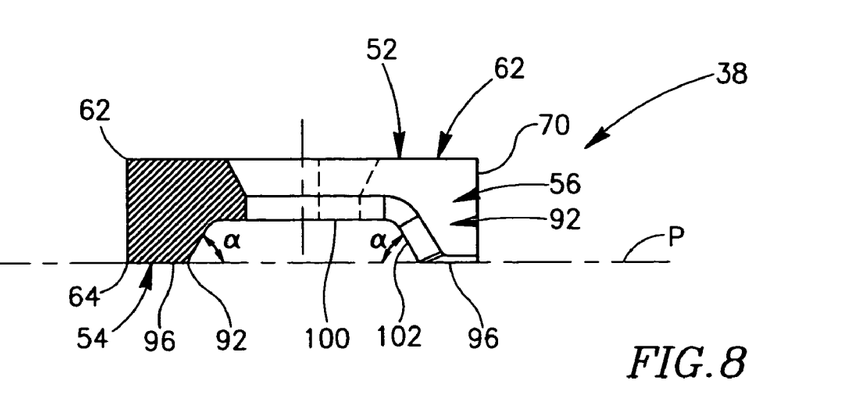
FIG. 8 is a partial cross section taken along the line VIII—VIII in FIG. 7.

Attention is now drawn to FIGS. 6 to 8. The clamping through-hole 44 passes through the cutting insert 38 between the top and the bottom faces 52, 54 and is generally centrally disposed in the top face 52. The clamping through-hole 44 merges with the top face 52 of the cutting insert 38 in a frustoconical rim 86. The bottom face 54 comprises two spaced-apart abutments 92 extending between the two side faces 56 (see also FIG. 5). Each of the two abutments 92 comprises a side-slope 102, and an abutment platform 96, the abutment platforms 96 being generally perpendicular to the end faces 48. The two side-slopes 102 merge with a ceiling 100 which is generally parallel to an imaginary plane P passing through the abutment platforms 96. Each side-slope 102 is inclined at an acute side-slope angle α to the imaginary plane P. In accordance with a preferred embodiment of the present invention, the side-slope angle α is 30 degrees.

Figure 9:
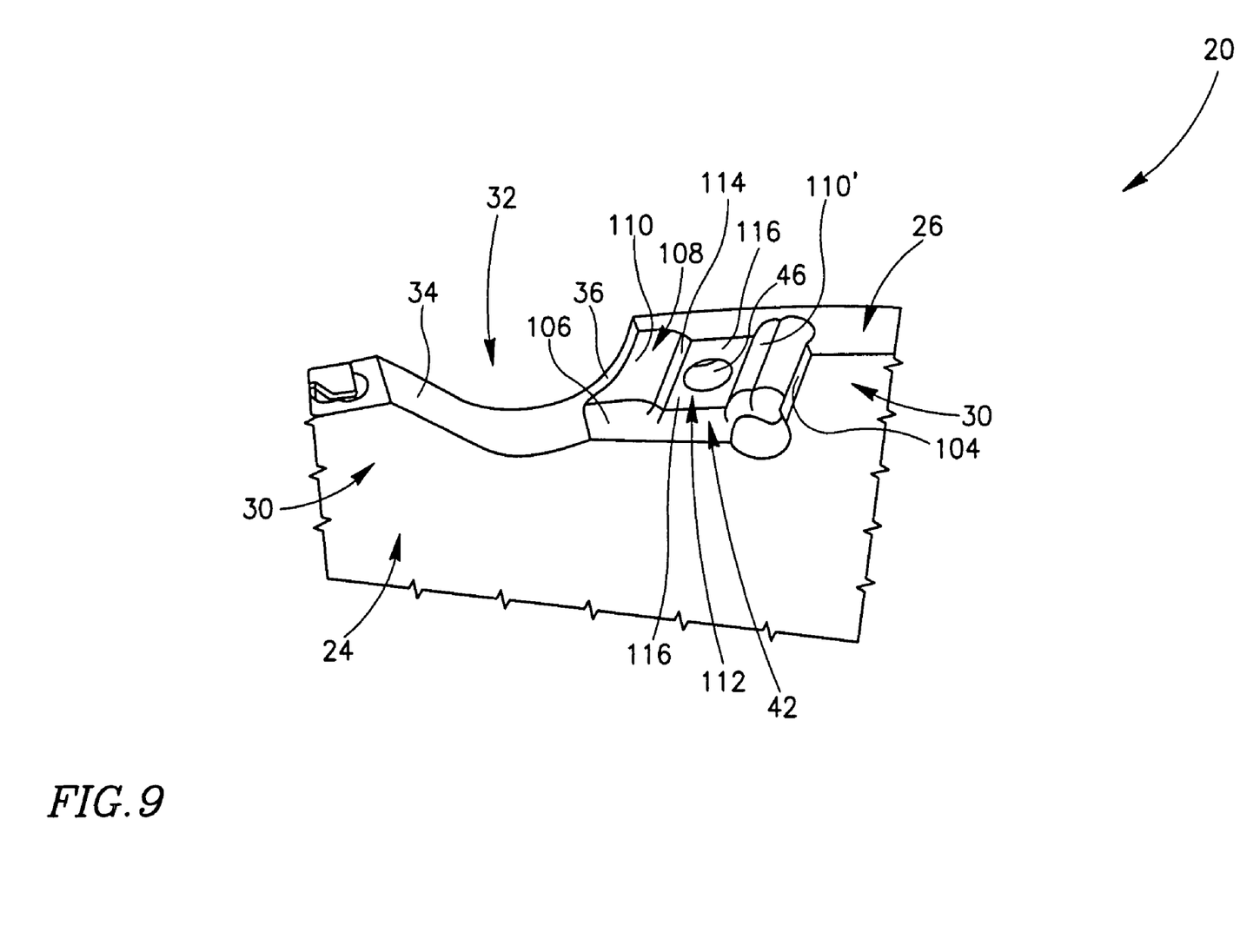
FIG. 9 is a detail perspective view of an insert pocket shown in FIG. 3.

Attention is now drawn to FIG. 9. The insert pocket 42 opens to the trailing end 36 of its associated chip clearance recess 32, and to the peripheral tool face 26, and is bounded by a radially extending tangential support wall 104, by a radial support wall 106, and by a generally axially disposed pocket base 108 which generally faces a direction along the axis of rotation A. The pocket base 108 comprises two generally axial support surfaces 110, 110', and a generally radially extending reinforcing rib 112, the rib 112 merging with the radial support wall 106 and extending to the peripheral tool face 26, thereby increasing the strength and rigidity of the insert pocket 42. The rib 112 comprises two sloping banks 114 and a generally flat roof 116 disposed therebetween, the roof 116 being parallel to the two axial support surfaces 110, 110'. The threaded clamping bore 46 is generally centrally disposed in the rib 112, extending generally axially from the roof 116 of the rib 112.

The threaded clamping bore 46 of the insert pocket 42 in accordance with the present invention allows improved engagement of the clamping screw 40 as compared with an insert pocket which does not have the rib 112. This is because more threads are provided in the threaded camping bore 46 due to the thickness of the rib 112, thereby allowing more threads of the clamping screw 40 to be engaged in the threaded clamping bore 46, and providing improved clamping of the cutting insert 38. This is particularly important when the slot milling cutter is required to cut thin slots, generally less than 6 mm, and typically 4 mm or less in width.

Figure 10:
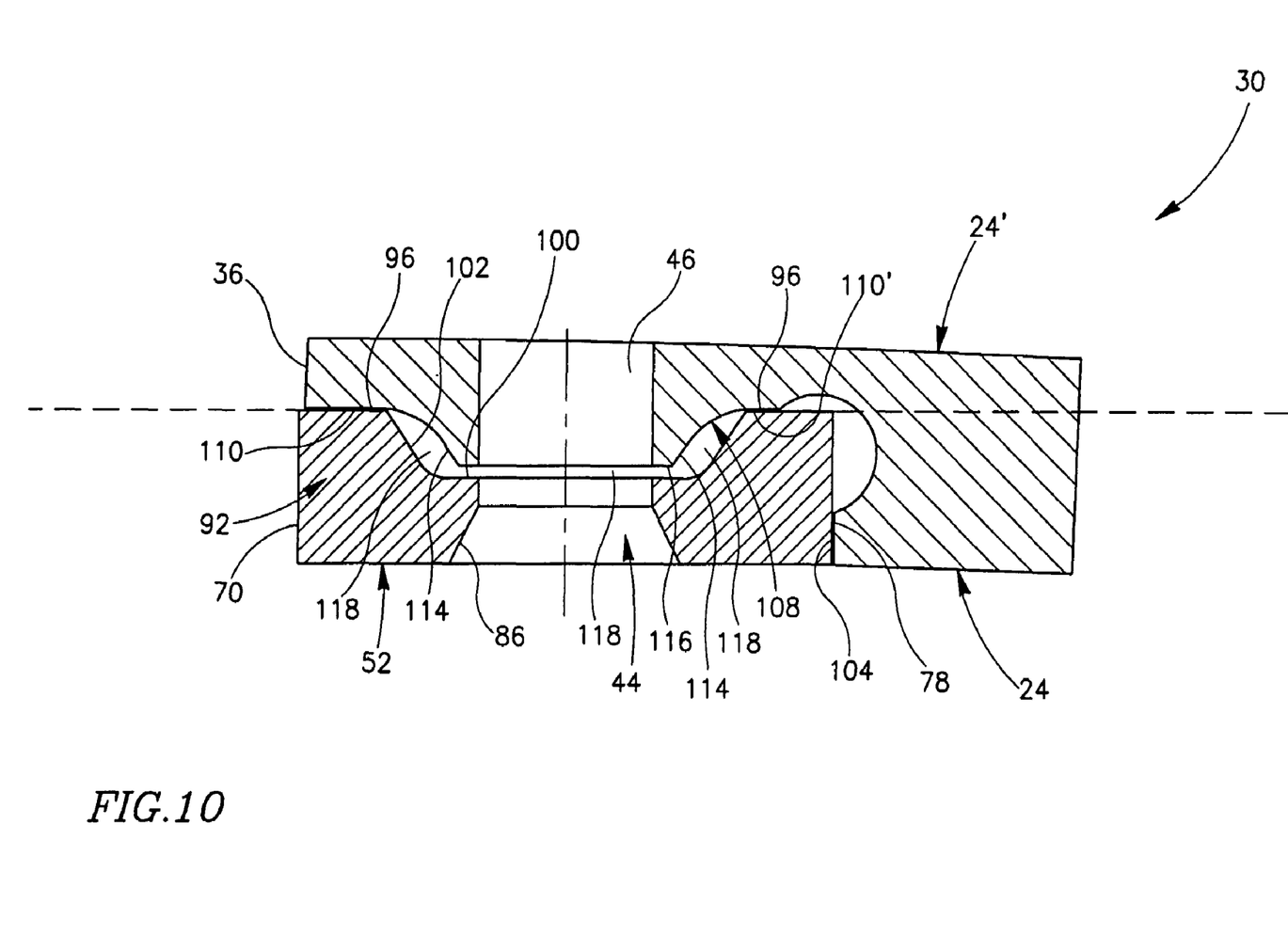
FIG. 10 is a cross section taken along the line X—X in FIG. 1.

When the cutting insert 38 is mounted in the insert pocket 42, one of the end faces 48 is mounted tangentially rearwardly, i.e. at the trailing end of the insert pocket 42, with its associated abutment surface 78 abutting the tangential support wall 104; the side face 56 located radially inwardly in the insert pocket 42 abuts the radial support wall 106. As shown in FIG. 10, the two abutment platforms 96 abut the two support surfaces 110, 110', and a gap 118 exists between the ceiling 100 and side-slopes 102 of the cutting insert 38 and between the roof 116 and the banks 114 of the rib 112.

The clamping screw 40 exerts considerable force on the cutting insert 38. However, the frustoconical rim 86 of the clamping through-hole 44, in conjunction with the side-slopes 102 of the abutments 92, transfer much of the clamping force sideways, to the tangential support wall 104 and to the radial support wall 106 of the insert pocket, reducing the bending moment acting on, and the breakage risk to, the cutting insert 38.

Figure 11:
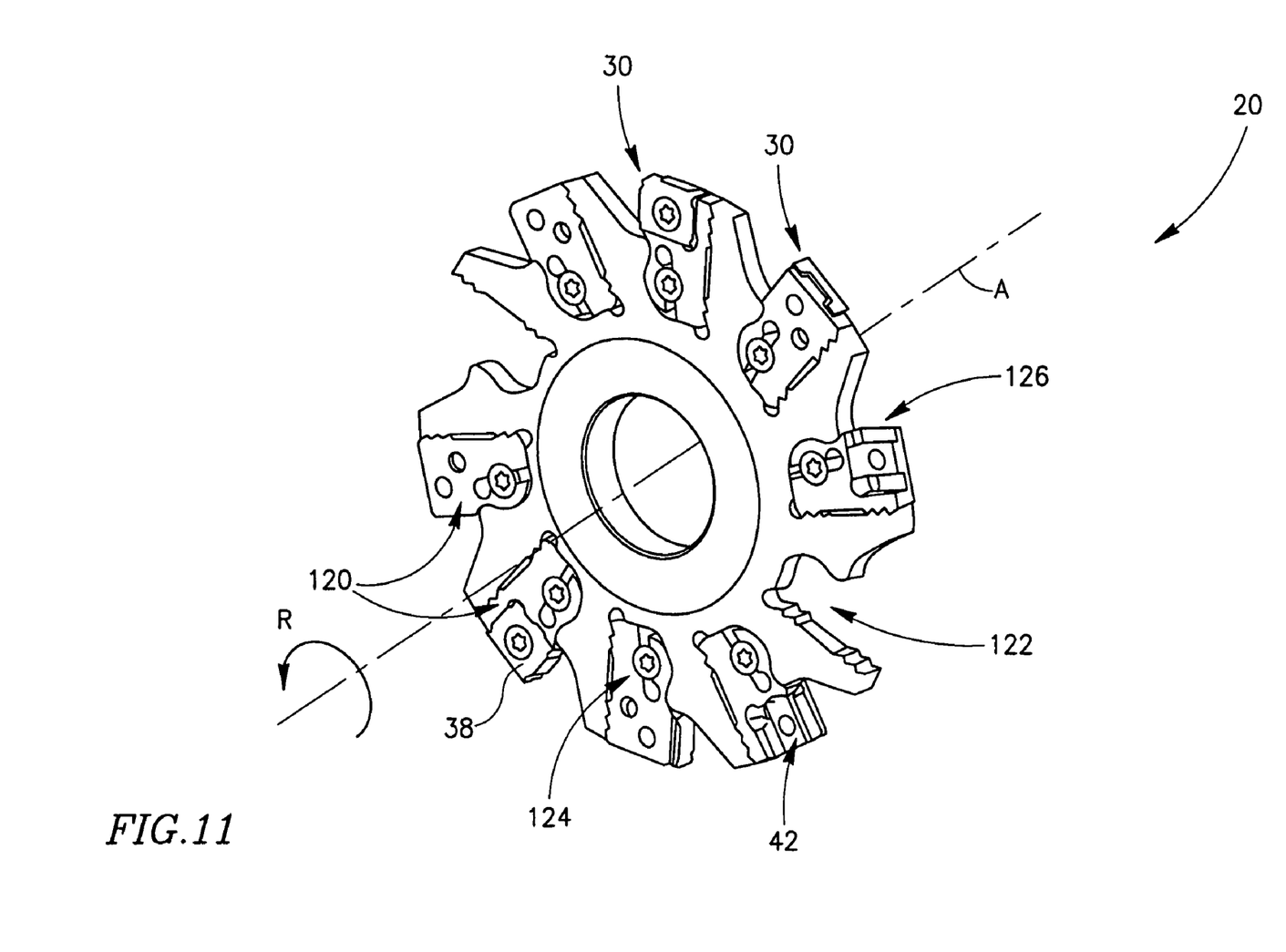
FIG. 11 is a perspective view of a rotary slot milling cutter comprising cutting portions located on cartridges.
Figure 12:
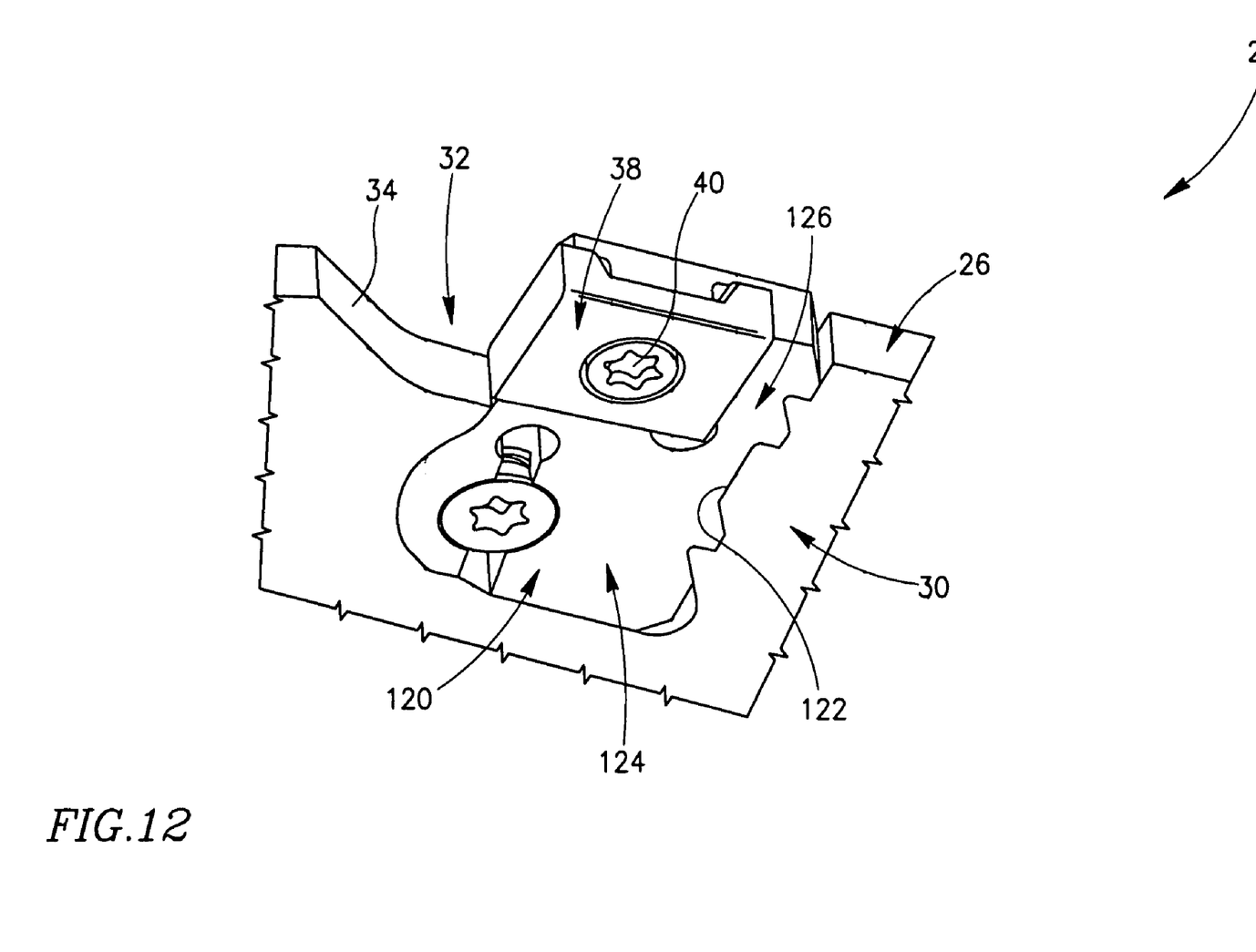
FIG. 12 is a detail perspective view of the cartridge and the cutting portion of the rotary slot milling cutter shown in FIG. 11.

It will be appreciated that the cutting portion 30 of the present invention does not have to be an integral part of the tool body 22. For example, the cutting portion 30 can be located on a cartridge. FIGS. 11 and 12 show the plurality of cutting portions 30, each cutting portion 30 being located on a cartridge 120, such as that disclosed in U.S. Published Application No. 2004-0161311, whose contents are incorporated by reference. The cartridge 120 comprises an insert bearing portion 122, in which the insert pocket 42 is disposed, and a clamping portion 124, the clamping portion 124 being axially slidably accommodated in a cartridge pocket 126 disposed in the tool body 22.

Although the present invention has been described to a certain degree of particularity, it should be understood that various alterations and modifications could be made without departing from the scope of the invention as hereinafter claimed.

What is claimed is:

1. A rotary slot milling cutter having an axis of rotation A comprising a disk shaped tool body having a plurality of cutting portions;

each cutting portion comprising an insert pocket and a cutting insert;

the cutting insert being removably mounted in the insert pocket;

the cutting insert comprising a top face and a bottom face;

the bottom face comprising two spaced-apart abutments, with a ceiling formed therebetween, each abutment comprising an abutment platform and a side-slope;

the insert pocket having a pocket base which generally faces a direction along the axis of rotation and comprises two support surfaces and a radially extending rib disposed therebetween, the rib comprising a roof and two banks; wherein when the cutting insert is mounted in the insert pocket, the abutment platforms abut the support surfaces, and a gap exists between the roof of the rib and the ceiling, and between each side-slope and adjacent banks.

2. A rotary milling cutter having an axis of rotation A comprising a tool body having a plurality of cutting portions;

each cutting portion comprising an insert pocket and a cutting insert;

the cutting insert being removably mounted in the insert pocket;

the cutting insert comprising a top face and a bottom face;

the bottom face comprising two spaced apart abutments, with a ceiling formed therebetween, each abutment comprising an abutment platform and a side-slope;

the insert pocket having a pocket base which generally faces a direction along the axis of rotation and comprises two support surfaces and a radially extending rib disposed therebetween, the rib comprising a roof and two banks; wherein:

when the cutting insert is mounted in the insert pocket, the abutment platforms abut the support surfaces, and a gap exists between the roof of the rib and the ceiling, and between each side-slope and adjacent banks; and the insert pocket comprises a generally radial support wall and a generally tangential support wall, and the rib merges with the radial support wall.

3. The rotary milling cutter of claim 2, wherein the cutting insert comprises two identical, opposing and parallel end faces having a peripheral surface extending therebetween, the peripheral surface comprising a top face perpendicular to the end faces, a bottom face opposing the top face, and two opposing, identical side faces parallel to each other and perpendicular to the end faces and to the top and bottom faces.

4. The rotary milling cutter of claim 3, wherein each end face meets each of the two identical side faces at two cutting edges.

5. The rotary milling cutter of claim 4, wherein an abutment surface is disposed in each end face, between the two cutting edges of each end face.

6. The rotary milling cutter of claim 5, wherein the abutment surface of one of the end faces abuts the tangential support wall and one of the side faces abuts the radial support wall.

7. The rotary milling cutter of claim 2, wherein the insert pocket is an integral part of a tool body of the rotary milling cutter.

8. The rotary milling cutter of claim 2, wherein the insert pocket is located on a cartridge, the cartridge being slidably retained in a tool body of the rotary milling cutter.

9. A rotary milling cutter having an axis of rotation A comprising a tool body having a plurality of cutting portions;

each cutting portion comprising an insert pocket and a cutting insert;

the cutting insert being removably mounted in the insert pocket;

the cutting insert comprising a top face and a bottom face;

the bottom face comprising two spaced-apart abutments, with a ceiling formed therebetween, each abutment comprising an abutment platform and a side-slope; the insert pocket having a pocket base which generally faces a direction along the axis of rotation and comprises two support surfaces and a radially extending rib disposed therebetween, the rib comprising a roof and two banks; wherein:

when the cutting insert is mounted in the insert pocket, the abutment platforms abut the support surfaces, and a gap exists between the roof of the rib and the ceiling, and between each side-slope and adjacent banks; and each side-slope is inclined at an acute side-slope angle $\alpha$ with respect to an imaginary plane P passing through the two abutment platforms.

10. The rotary milling cutter of claim 9, wherein the side-slope angle $\alpha$ is between 20 degrees and 50 degrees.

11. The rotary milling cutter of claim 10, wherein the side-slope angle $\alpha$ is 30 degrees.

* * * * *